United States Patent
Peake

(10) Patent No.: US 10,656,871 B2
(45) Date of Patent: *May 19, 2020

(54) EXPANDING SLICE COUNT IN RESPONSE TO LOW-LEVEL FAILURES

(71) Applicant: International Business Machines Corporation, Armonk, NY (US)

(72) Inventor: Andrew G. Peake, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,262

(22) Filed: Nov. 28, 2018

(65) Prior Publication Data

US 2019/0095128 A1 Mar. 28, 2019

Related U.S. Application Data

(63) Continuation of application No. 15/249,353, filed on Aug. 27, 2016, now Pat. No. 10,209,921.

(Continued)

(51) Int. Cl.
*G06F 11/10* (2006.01)
*H03M 13/15* (2006.01)
(Continued)

(52) U.S. Cl.
CPC ............ *G06F 3/0653* (2013.01); *G06F 3/064* (2013.01); *G06F 3/067* (2013.01); *G06F 3/0611* (2013.01);

(Continued)

(58) Field of Classification Search
CPC ........ G06F 3/0619; G06F 3/064; G06F 3/067; G06F 3/0661; G06F 3/0611;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Guy J Lamarre
(74) *Attorney, Agent, or Firm* — Garlick & Markison; Timothy W. Markison; Timothy D. Taylor

(57) ABSTRACT

A method begins with determining a memory device of a dispersed storage network (DSN) has an issue, where a data segment of a data object is dispersed storage error encoded to produce a set of encoded data slices that is stored in a set of storage units of the DSN, where a storage unit includes a plurality of memory devices that includes the memory device, and where the memory device stores an encoded data slice of the set of encoded data slices. The method continues by identifying an issue with the memory device and by identifying sets of encoded data slices. The method continues by generating an additional encoded data slice for each of the sets of encoded data slices to produce a group of encoded data slices and storing the group of encoded data slices in at least one other memory device of the DSN.

18 Claims, 8 Drawing Sheets

Related U.S. Application Data

(60) Provisional application No. 62/222,819, filed on Sep. 24, 2015.

(51) Int. Cl.

| | | |
|---|---|---|
| *G06F 3/06* | (2006.01) | |
| *H04L 29/06* | (2006.01) | |
| *H04L 9/08* | (2006.01) | |
| *H03M 13/37* | (2006.01) | |
| *G06F 11/20* | (2006.01) | |
| *G06F 9/48* | (2006.01) | |
| *H04L 9/14* | (2006.01) | |
| *H04L 29/08* | (2006.01) | |
| *G06F 12/06* | (2006.01) | |
| *H04L 12/24* | (2006.01) | |
| *H04L 12/927* | (2013.01) | |
| *G06F 8/65* | (2018.01) | |

(52) U.S. Cl.
CPC .......... *G06F 3/0614* (2013.01); *G06F 3/0619* (2013.01); *G06F 3/0659* (2013.01); *G06F 3/0661* (2013.01); *G06F 8/65* (2013.01); *G06F 11/1092* (2013.01); *H03M 13/154* (2013.01); *H03M 13/3761* (2013.01); *H04L 63/061* (2013.01); *H04L 67/1097* (2013.01); *H04L 67/32* (2013.01); *H04L 67/34* (2013.01); *H03M 13/1515* (2013.01); *H04L 67/02* (2013.01); *H04L 67/06* (2013.01); *H04L 67/42* (2013.01)

(58) Field of Classification Search
CPC ........ G06F 3/0653; G06F 3/0659; G06F 8/65; G06F 11/1092; H04L 63/061; H04L 67/1097; H04L 67/34; H04L 67/32; H04L 67/06; H04L 67/02; H04L 67/42; H03M 13/154; H03M 13/1515; H03M 13/3761
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,203,871 B2 | 4/2007 | Turner et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,558,059 B2 | 1/2017 | Baptist et al. | |
| 9,749,419 B2 | 8/2017 | Baptist et al. | |
| 9,774,680 B2 | 9/2017 | Vas et al. | |
| 10,209,921 B2 * | 2/2019 | Peake .................. G06F 3/0619 | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0114728 A1 | 5/2005 | Aizawa et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2016/0070719 A1 | 3/2016 | Resch et al. | |
| 2017/0060689 A1 | 3/2017 | Resch | |
| 2017/0132079 A1 | 5/2017 | Khadiwala | |
| 2018/0024886 A1 | 1/2018 | Kazi | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

(56) References Cited

OTHER PUBLICATIONS

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

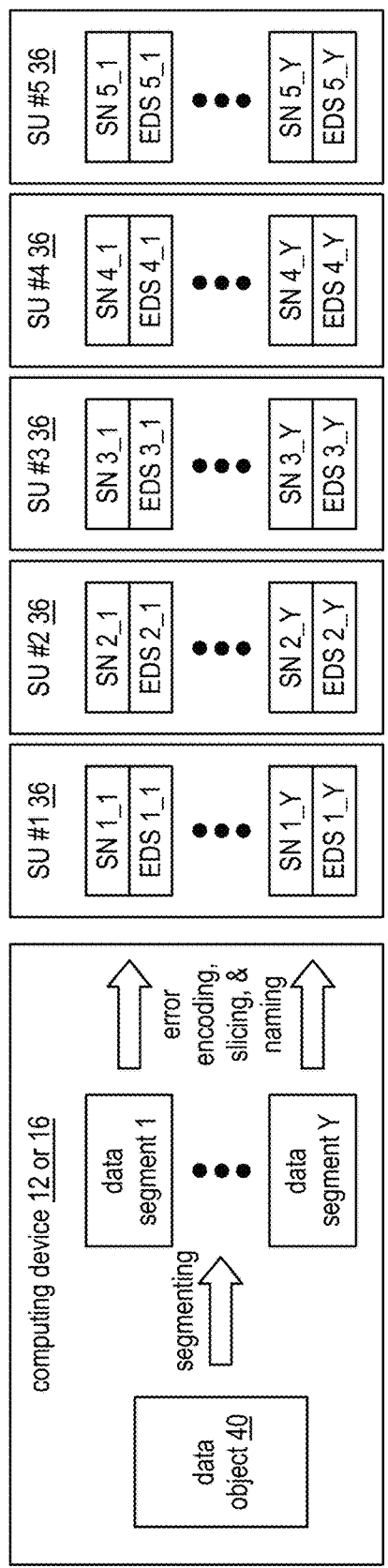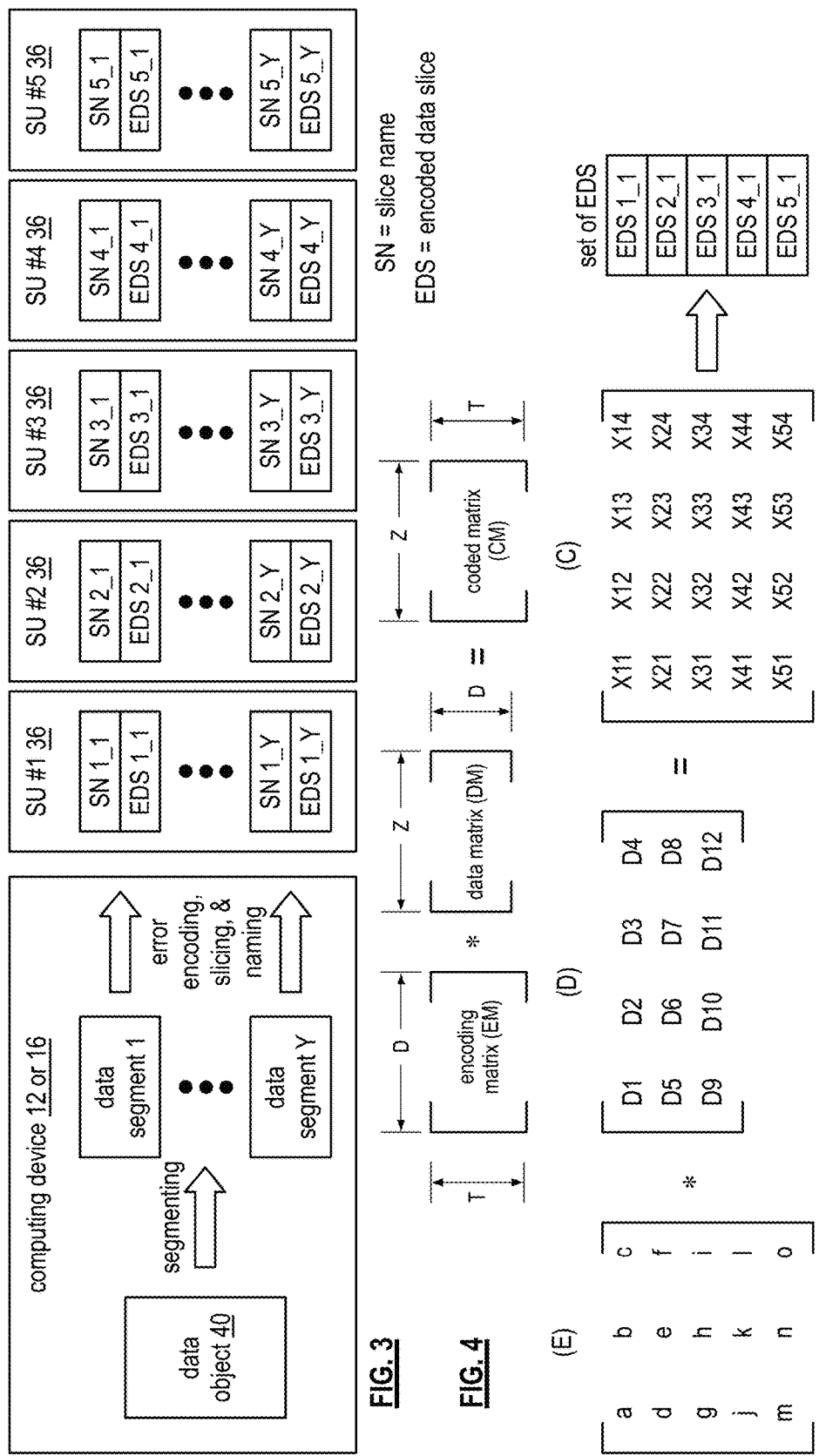
FIG. 3
FIG. 4
FIG. 5
FIG. 6

EXPANDING SLICE COUNT IN RESPONSE TO LOW-LEVEL FAILURES

CROSS REFERENCE TO RELATED PATENTS

The present U.S. Utility Patent Application claims priority pursuant to 35 U.S.C. § 120 as a continuation of U.S. patent application Ser. No. 15/249,353, entitled "EXPANDING SLICE COUNT IN RESPONSE TO LOW-LEVEL FAILURES", filed Aug. 27, 2016, issued as U.S. Pat. No. 10,209,921 on Feb. 19, 2019, which claims priority pursuant to 35 U.S.C. § 119(e) to U.S. Provisional Application No. 62/222,819, entitled "IDENTIFYING AN ENCODED DATA SLICE FOR REBUILDING", filed Sep. 24, 2015, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. With cloud storage systems, memory devices are known to fail, go offline, or otherwise be unavailable. Data stored within these memory devices may be temporarily unavailable or permanently damaged or lost.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
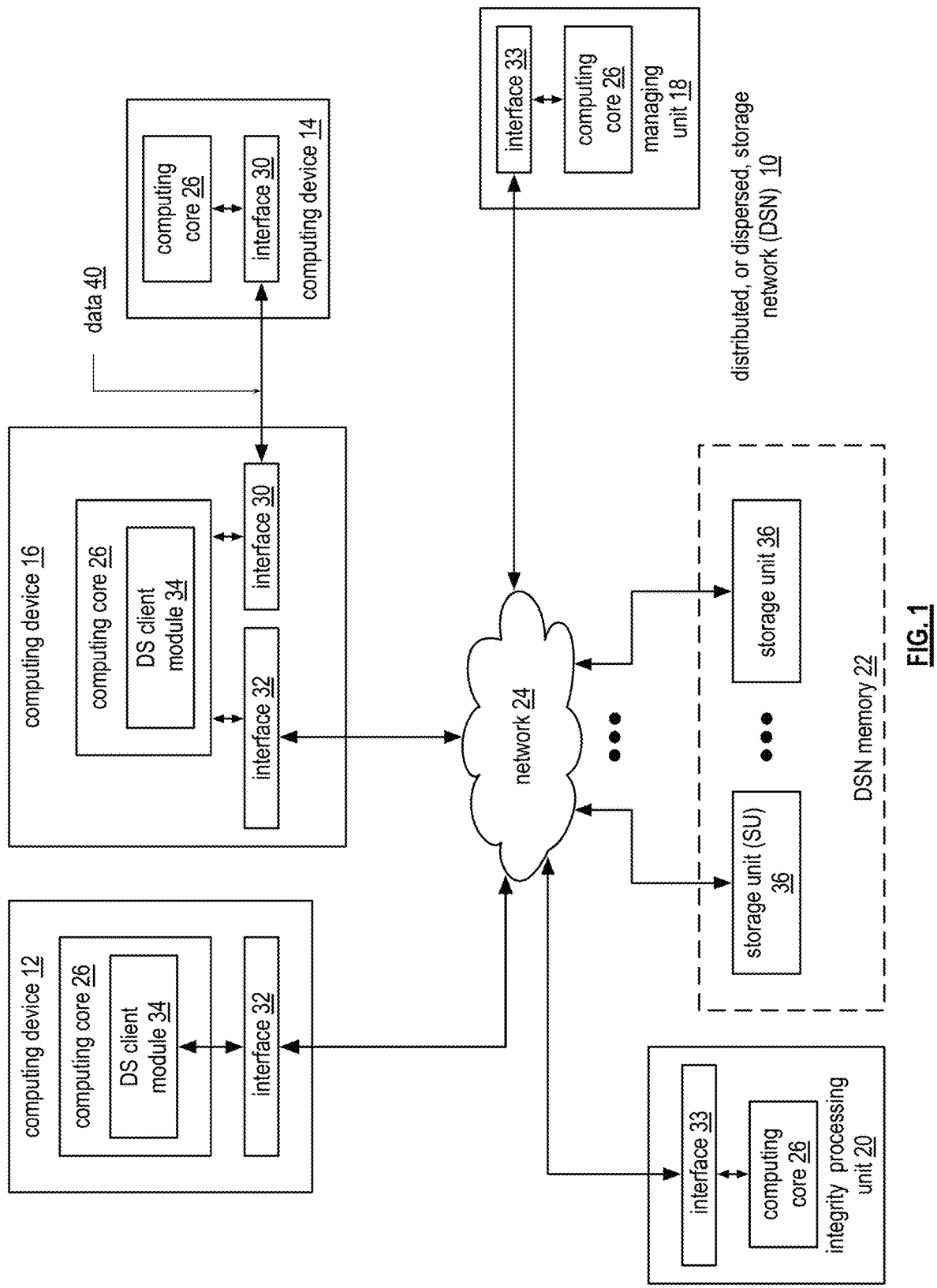
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
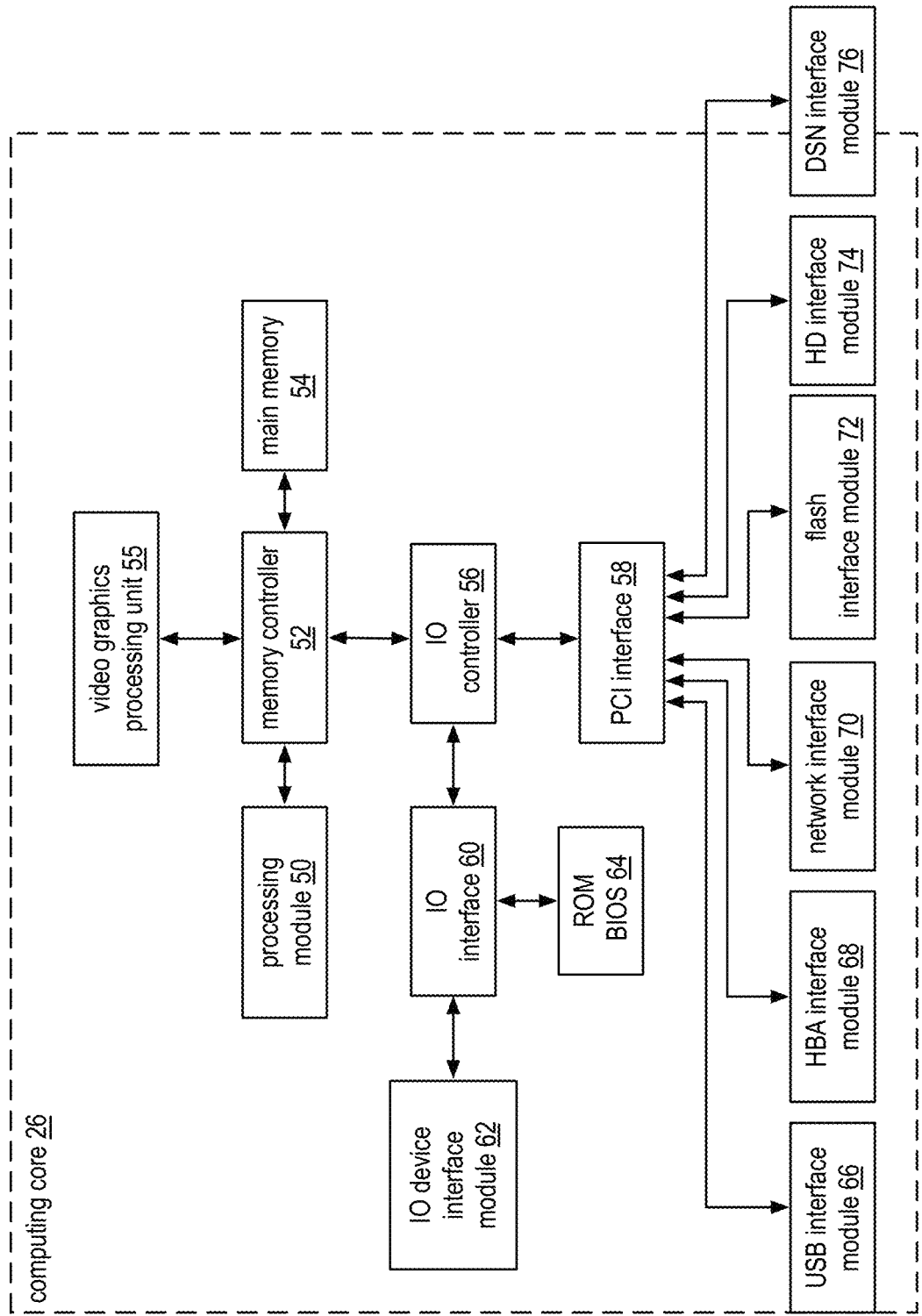
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
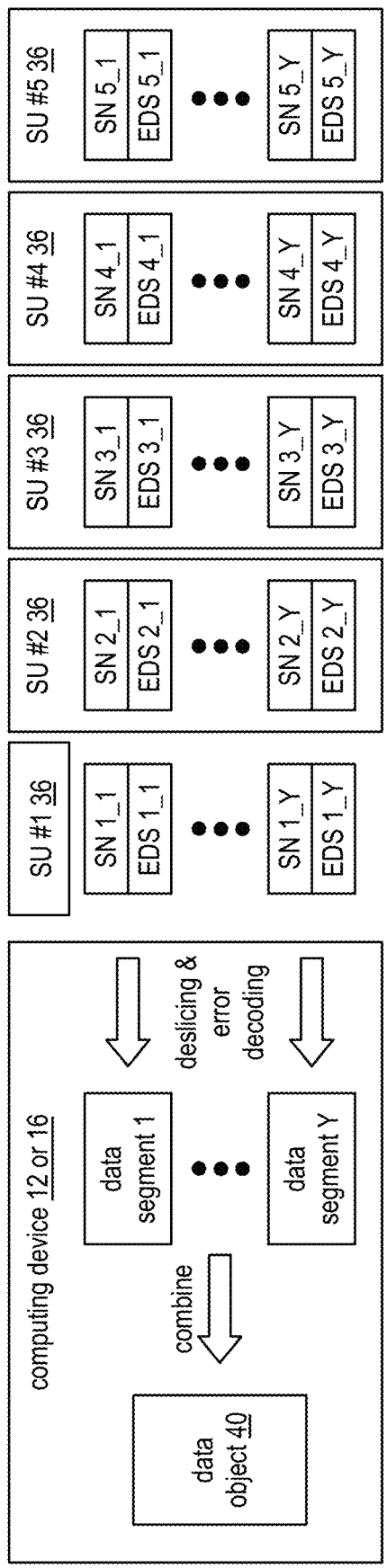
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
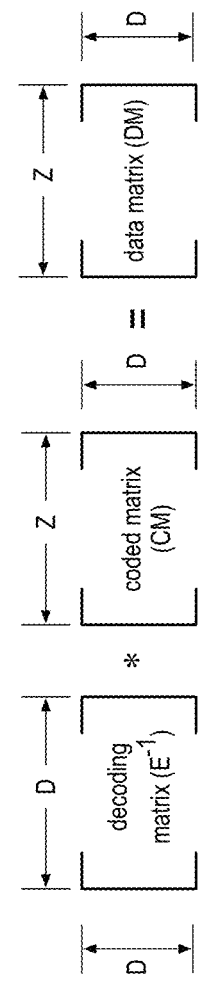
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
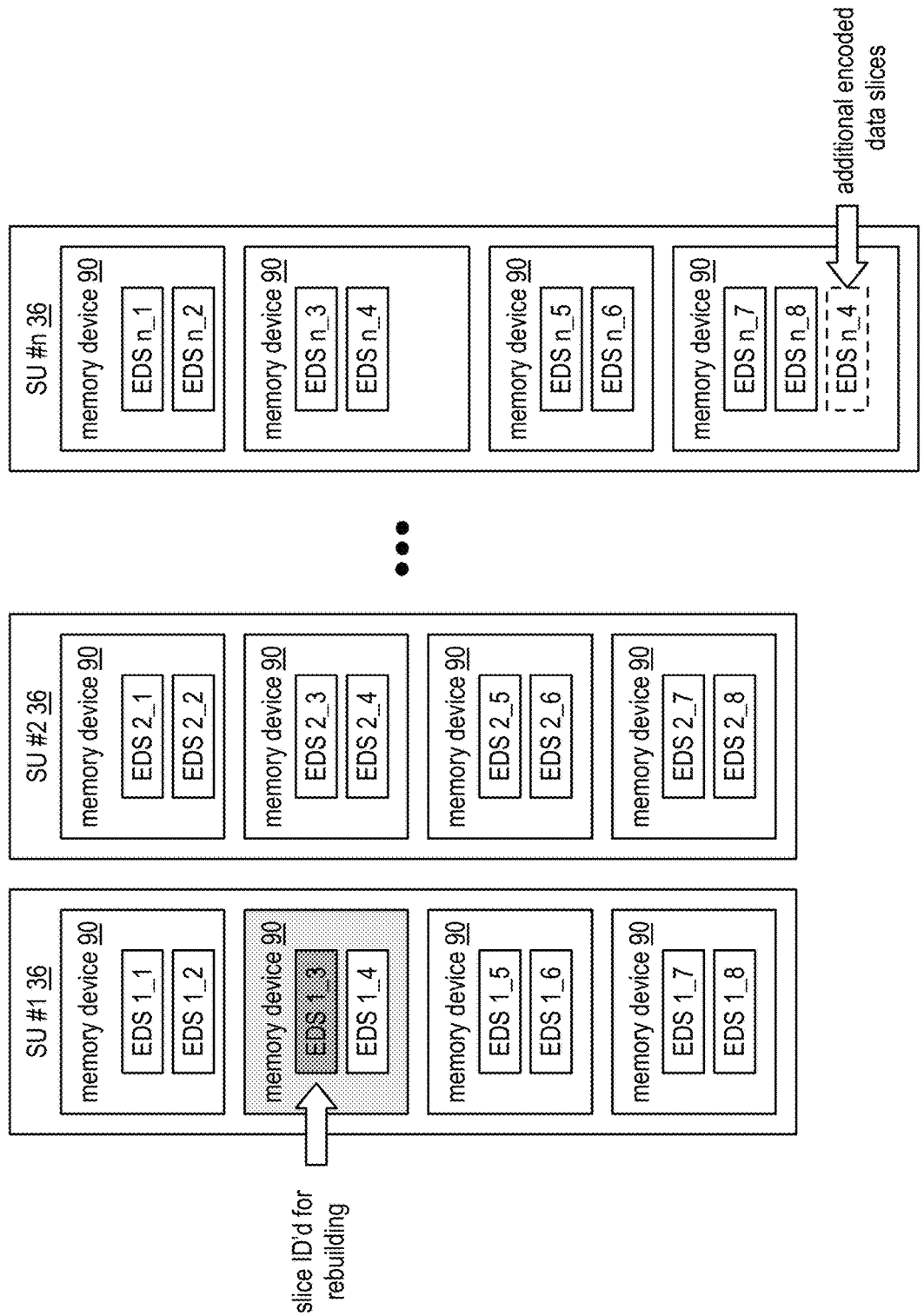
FIG. 9 is a schematic block diagram of an example of generating additional encoded data slices in accordance with the present invention.

FIG. 9 is a schematic block diagram of an example of identifying a memory device issue and generating additional encoded data slices to provide additional reliability. As illustrated, a set of storage units 36 (e.g., SU #1-n) stores sets of encoded data slices (e.g., EDS 1_1-EDS n_1, EDS 1_8-EDS n_8). Each storage unit 36 includes four memory devices 90 that initially each store two encoded data slices of a corresponding two of the sets of encoded data slices. For example, the first memory device 90 of a first storage unit (SU #1 36) stores a first encoded data slice of a first set (e.g., EDS 1_1) and a first encoded data slice of a second set (e.g., EDS 1_2). As another example, a second memory device of the second storage unit stores a second encoded data slice of a third set (e.g., EDS 2_3) and a second encoded data slice of a fourth set (e.g., EDS 2_4), and so on.

When encoded data slice EDS 1_3 is identified for rebuilding (e.g., corrupt, damaged, etc.), a computing device 12 or 16 identifies the memory device where the identified encoded data slice is stored (e.g., the second memory device 90 of SU #1 36) and checks whether the memory device has an issue (e.g., soft failure, flagged for replacing, exceeded an age limit, etc.). When a memory device has an issue, other encoded data slices stored therein are going to require rebuilding when the memory device fails. To avoid, or reduce the need for, future rebuilding of these encode data slices, additional encoded data slices are created and stored in a different memory location (e.g., a different storage unit).

For instance, the computing device generates one or more additional encoded data slices (EDSs) for each set of EDSs having an EDS stored in the memory device with the issue. As an example for a set of encoded data slices, the computing device adds another row to the encoding matrix (e.g., of FIGS. 4 and 5) and matrix multiples the additional row of the encoding matrix with the data matrix to produce a new (i.e., additional) encoded data slice. In the present example, the computing device generates an additional encoded data slice (EDS n_4) to provide additional reliability for the set of encoded data slices that includes EDS 1_4. The additional encoded data slice is stored in the fourth memory device of the nth storage unit. Note that the nth storage unit may be one of the storage units in the set of storage units or an extra storage unit, thus expanding the set of storage units by one. Further note that the encoded data slice identified for rebuilding is rebuilt using a rebuilding processing of reconstructing the data segment and re-encoding the reconstructed data segment. Still further note that the computing device may generate an additional encoded data slice (e.g., EDS n_3) for the set of encoded data slices including EDS 1_3.

Figure 10:
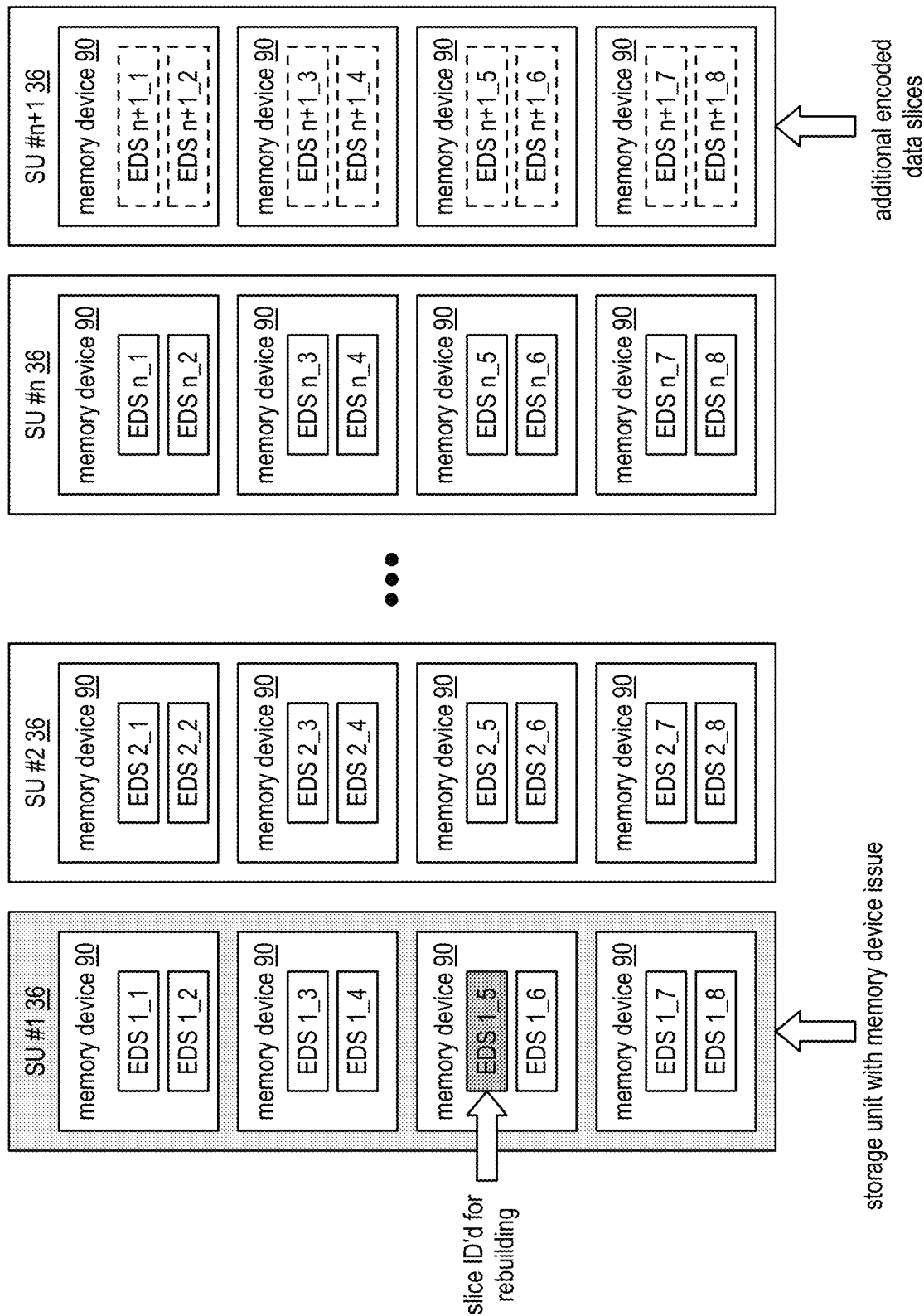
FIG. 10 is a schematic block diagram of another example of generating additional encoded data slices in accordance with the present invention.

FIG. 10 is a schematic block diagram of another example of identifying a memory device issue and generating additional encoded data slices to provide additional reliability. As shown, encoded data slice EDS 1_5 is identified for rebuilding. A computing device identifies the memory device (e.g., third memory device 90), storage unit (e.g., SU #1 36) storing the identified encoded data slice, and an issue with the storage unit (e.g., soft failure, flagged for replacing, exceeding an age limit, etc.). The computing device then identifies sets of encoded data slices that have an encoded data slice of the sets of encoded data slices stored in the storage unit (e.g., EDS 1_1-EDS n_1 through EDS 1_8-EDS n_8). The computing device then generates additional encoded data slices (e.g., EDS n+1_1-EDS n+1_8) to provide additional reliability for each of the sets of encoded data slices. The additional encoded data slices are stored in the memory devices of another storage unit (SU # n+1 36) thereby expanding the set of storage units.

Figure 11:
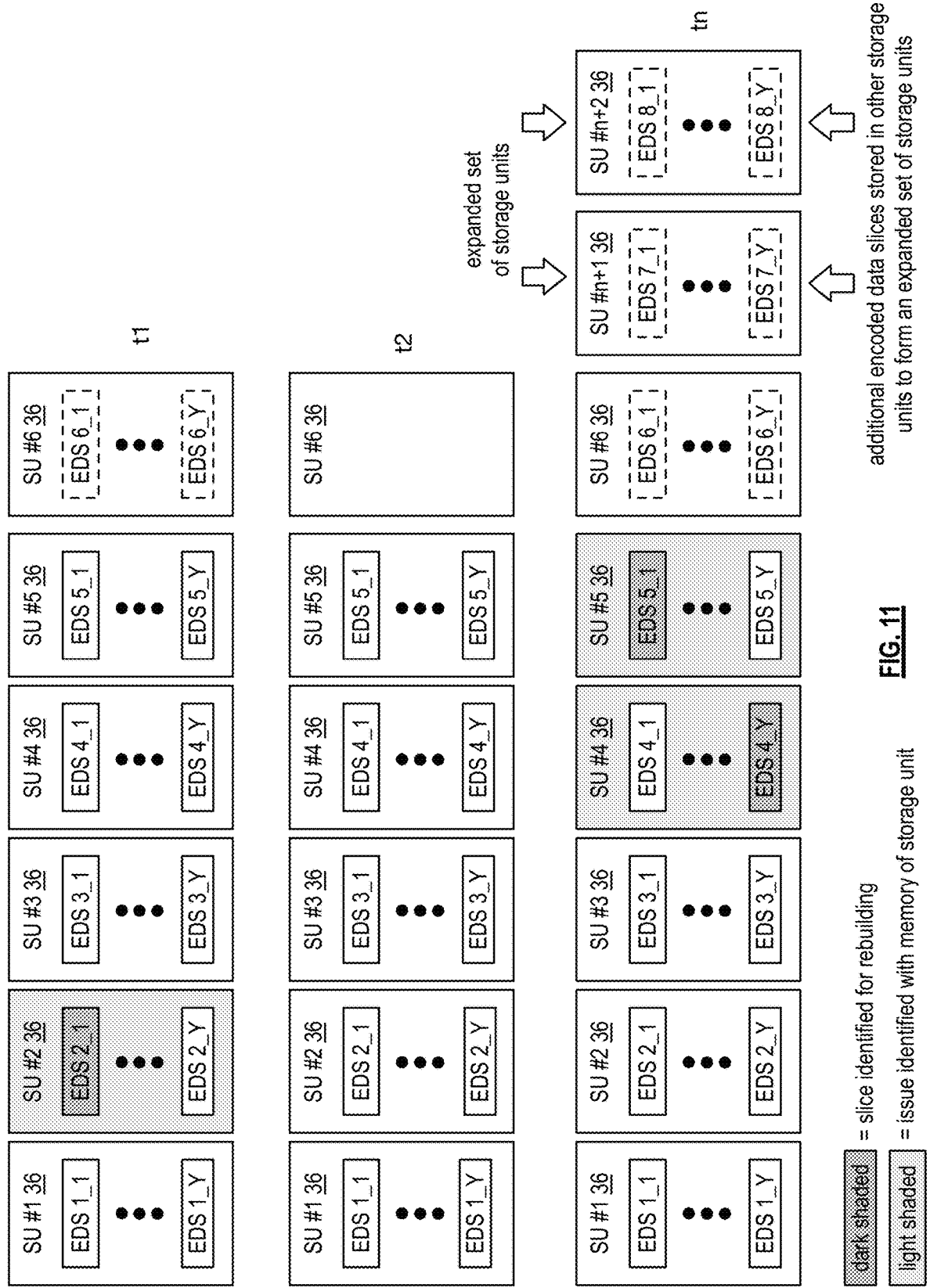
FIG. 11 is a schematic block diagram of yet another example of generating additional encoded data slices in accordance with the present invention.

FIG. 11 is a schematic block diagram of an example of generating additional encoded data slices. As shown, a set of storage units initially include 6 storage units (e.g., SU #1-6 36) that initially store Y sets of encoded data slices (e.g., EDS 1_1-EDS 5_1 through EDS 1_Y-EDS 5_Y). At a first time (e.g., t1), an encoded data slice EDS 2_1, which is stored in a memory device of the second storage unit, is identified by a computing device for rebuilding. The computing device then identifies the second storage unit (e.g., SU #2) to have a memory issue. The computing device then generates additional encoded data slices (e.g., EDS 6_1, EDS 6_Y) to provide additional reliability for each of the sets of encoded data slices. As shown, the computing device then stores the additional encoded data slices (e.g., EDS 6_1-EDS 6_Y) in the sixth storage unit of the set of storage units.

At a second time (e.g., t2), an issue with the memory of the second storage unit is resolved and the encoded data slice in need of rebuilding has been rebuilt. At this point in time, the computing device determines whether to delete the additional encoded data slices (EDS 6_1-EDS 6_Y). If so, they are delated as shown. Otherwise, they remain the storage unit #6.

At a further time (e.g., tn), the computing device identifies encoded data slices EDS 4_Y and EDS 5_1 for rebuilding and identifies storage units four and five to have a memory issue. The computing device generates additional encoded data slices (e.g., EDS 6_1-EDS 6_Y, EDS 8_1-EDS 8_Y) and then stores the additional encoded data slices in the sixth storage unit of the set of storage units and two other storage units (e.g., SU # n, SU # n+1). As such, the set of storage units are expanded to include storage units #1, #2, #3, #6, # n+1 and # n+2. Note the additional encoded data slices may be generated one or more times and may be stored in one or more storage units. For example, the group of encoded data slices EDS 6_1 through EDS 6_Y may be generated and copied to form three groups of encoded data slices EDS 6_1 through EDS 6_Y. Each one of the three groups are then stored in storage units SU #6, SU # n+1 and SU # n+2.

Figure 12:
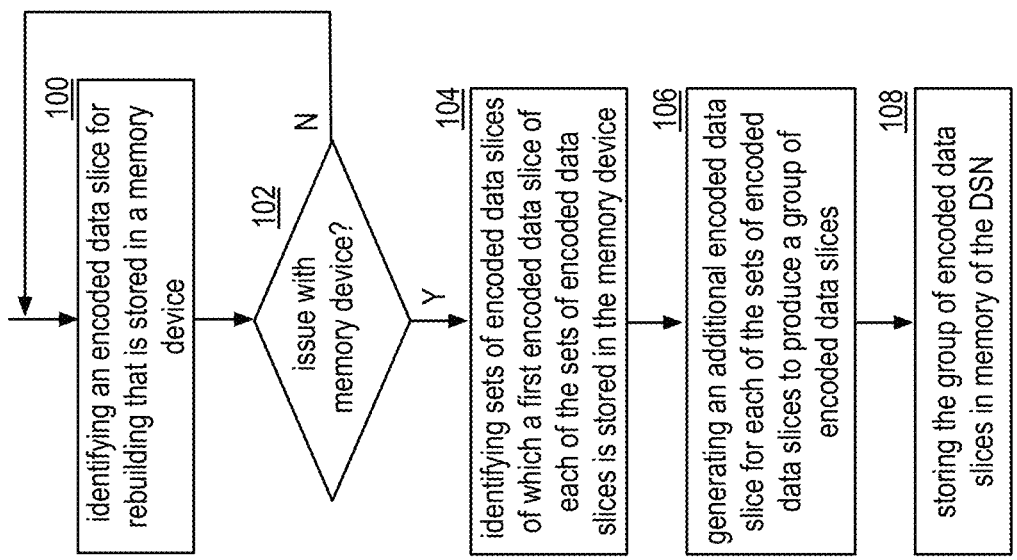
FIG. 12 is a logic flow diagram of identifying a memory device issue and generating additional encoded data slices in accordance with the present invention.

FIG. 12 is a logic flow diagram of a method of identifying a memory device issue and generating additional encoded data slices. The method begins with step 100, where a computing device identifies an encoded data slice for rebuilding. Note that a data segment of a data object is dispersed storage error encoded to produce a set of encoded data slices that is stored in a set of storage units of the DSN. Further note that the set of encoded data slices includes the encoded data slice for rebuilding and a storage unit of the set of storage units includes a plurality of memory devices. Still further note that the storage unit includes a memory device of the plurality of memory devices that stores the encoded data slice.

The method continues with step 102, where the computing device determines if there is an issue (e.g., soft failure, flagged for replacing, exceeded an age limit, etc.) with the memory device. For example, the computing device determines (e.g., identifies) the issue by one or more of, receiving a message indicating the memory device has the issue, accessing a maintenance schedule that indicates the memory device is identified for replacement, and determining the storage unit is inaccessible.

When there is not an issue with the memory device, the method loops back to step 100. When there is an issue with the memory device, the method continues to step 104, where the computing device identifies sets of encoded data slices, of which a first encoded data slice of each of the sets of encoded data slices is stored in the memory device. For example, the computing device identifies the sets of encoded data slices by sending a list request to the storage unit regarding the group of encoded data slices, receiving a list of group of slice names for the group of encoded data slices, and interpreting the group of slices names to identify the sets of encoded data slices.

The method continues with step 106, where the computing device generates at least one additional encoded data slice for each of the sets of encoded data slices to produce at least one group of encoded data slices. For example, the computing device generates the at least one additional encoded data slice for each of the sets of encoded data slices by determining a number of additional encoded data slices to generate for the each of the sets of encoded data slices. Note the number is based on a comparison of one or more of the write threshold number of the sets of encoded data slices, the read threshold number of the sets of encoded data slices, the decode threshold number of the sets of encoded data slices, and the pillar width number of the sets of encoded data slices.

The computing device may also determine the number by determining a cost associated with an expanded set of storage units, wherein the expanded set of storage units include at least one of the set of storage units and one or more other storage units. The cost associated with the expanded set of storage units includes on one or more of historical performance, bandwidth, and available storage. For example, the computing device may determine to generate a first number of additional encoded data slices when the cost is below a first cost threshold. As another example, the computing device may determine to generate a second number of additional encoded data slices when the cost is equal to or above the first cost threshold. Note the second number is less than the first number.

For example, assuming that each set of the sets of encoded data slices includes 4 stored encoded data slices after identifying the memory issue, the decode threshold is 4, the read/write threshold is 5 and the pillar width number is 8, the computing device generates two additional encoded data slices for each of the sets of encoded data slices (to bring each set to 6 stored encoded data slices), when the comparison of the available encoded data slices each of sets of encoded data slices with the decode threshold number indicates a first difference (e.g., 0), and the cost analysis supports the expansion. As another example, assuming that each set of the sets of encoded data slices includes 5 stored encoded data slices after identifying the memory issue, the decode threshold is 4, the read/write threshold is 5 and the pillar width number is 8, the computing device generates one additional encoded data slice for each of the sets of encoded data slices (now each set stores 6 encoded data slices), when the comparison of the available encoded data slices of each of sets of encoded data slices with the decode threshold indicates a second difference (e.g., 1), and the cost analysis supports the expansion.

The method continues with step 108, where the computing device stores the group of encoded data slices in memory of the DSN. For example, the computing device stores the group of encoded data slices in one or more other memory devices of the plurality of memory devices of the storage unit. As another example, the computing device stores the group of encoded data slices in another storage unit, wherein the set of storage units is expanded to include the other storage unit.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a storage network, the method comprises:
   determining a memory device of the storage network has an issue, wherein a data segment of a data object is dispersed storage error encoded to produce a set of encoded data slices that is stored in a set of storage units of the storage network, wherein a storage unit of the set of storage units includes a plurality of memory devices, wherein the plurality of memory devices includes the memory device, and wherein the memory device stores an encoded data slice of the set of encoded data slices;
   identifying sets of encoded data slices, wherein a first encoded data slice of each of the sets of encoded data slices is stored in the memory device;
   generating at least one additional encoded data slice for each of the sets of encoded data slices to produce at least one group of encoded data slices; and
   storing the at least one group of encoded data slices in at least one other memory device of the storage network.

2. The method of claim 1, wherein the determining the memory device has the issue comprises one or more of:
   receiving a message indicating the memory device has the issue;
   determining an age of the memory device has exceeded an age threshold;
   accessing a maintenance schedule, wherein the memory device is identified for replaced in the maintenance schedule; and
   determining the storage unit is inaccessible.

3. The method of claim 1, wherein the identifying the sets of encoded data slices comprises:

sending a list request to the storage unit regarding the at least one group of encoded data slices;
receiving a list of a group of slice names for the at least one group of encoded data slices; and
interpreting the group of slices names to identify the sets of encoded data slices.

4. The method of claim 1, wherein the generating the at least one additional encoded data slice for each of the sets of encoded data slices comprises:
determining a number of additional encoded data slices to generate for the each of the sets of encoded data slices, wherein the number is based on a comparison of one or more of:
a number of available encoded data slices in each of the sets of encoded data slices;
a write threshold number of the sets of encoded data slices;
a read threshold number of the sets of encoded data slices;
a decode threshold number of the sets of encoded data slices; and
a pillar width number of the sets of encoded data slices.

5. The method of claim 4, wherein the determining the number further comprises:
determining a cost associated with an expanded set of storage units, wherein the expanded set of storage units include at least one of the set of storage units and one or more other storage units;
when the cost is below a first cost threshold, generating a first number of additional encoded data slices; and
when the cost is equal to or above the first cost threshold, generating a second number of additional encoded data slices, wherein the second number is less than the first number, and wherein the cost associated with the expanded set of storage units includes on one or more of:
historical performance;
bandwidth; and
available storage.

6. The method of claim 1, wherein the storing the at least one group of encoded data slices comprises:
storing the at least one group of encoded data slices in one or more other memory devices of the plurality of memory devices of the storage unit.

7. The method of claim 1, wherein the storing the at least one group of encoded data slices comprises:
storing the at least one group of encoded data slices in another storage unit, wherein the set of storage units is expanded to include the other storage unit.

8. The method of claim 1 further comprises:
determining whether the memory device still has the issue; and
when the memory device no longer has the issue:
sending the at least one group of encoded data slices from the at least one other memory device to the memory device for storage therein.

9. The method of claim 8 further comprises:
deleting the at least one group of encoded data slices from the at least one other memory device.

10. A computing device comprises:
an interface;
a memory; and
a processing module, wherein the processing module is operably coupled the memory and the interface, wherein the processing module is operable to:
determine a memory device of a storage network has an issue, wherein a data segment of a data object is dispersed storage error encoded to produce a set of encoded data slices that is stored in a set of storage units of the storage network, wherein a storage unit of the set of storage units includes a plurality of memory devices, wherein the plurality of memory devices includes the memory device, and wherein the memory device stores an encoded data slice of the set of encoded data slices;
identify sets of encoded data slices, wherein a first encoded data slice of each of the sets of encoded data slices is stored in the memory device;
generate at least one additional encoded data slice for each of the sets of encoded data slices to produce at least one group of encoded data slices; and
store the at least one group of encoded data slices in at least one other memory device of the storage network.

11. The computing device of claim 10, wherein the processing module determines the memory device has the issue by one or more of:
receiving a message indicating the memory device has the issue;
determining an age of the memory device has exceeded an age threshold;
accessing a maintenance schedule, wherein the memory device is identified for replaced in the maintenance schedule; and
determining the storage unit is inaccessible.

12. The computing device of claim 10, wherein the processing module is operable to identify the sets of encoded data slices by:
sending, via the interface, a list request to the storage unit regarding the at least one group of encoded data slices;
receiving, via the interface, a list of a group of slice names for the at least one group of encoded data slices; and
interpreting the group of slices names to identify the sets of encoded data slices.

13. The computing device of claim 10, wherein the processing module is further operable to generate the at least one additional encoded data slice for each of the sets of encoded data slices by:
determining a number of additional encoded data slices to generate for the each of the sets of encoded data slices, wherein the number is based on a comparison of one or more of:
a number of available encoded data slices in each of the sets of encoded data slices;
a write threshold number of the sets of encoded data slices;
a read threshold number of the sets of encoded data slices;
a decode threshold number of the sets of encoded data slices; and
a pillar width number of the sets of encoded data slices.

14. The computing device of claim 13, wherein the processing module is further operable to determine the number by:
determining a cost associated with an expanded set of storage units, wherein the expanded set of storage units include at least one of the set of storage units and one or more other storage units;
when the cost is below a first cost threshold, generating a first number of additional encoded data slices;
when the cost is equal to or above the first cost threshold, generating a second number of additional encoded data slices, wherein the second number is less than the first number, and wherein the cost associated with the expanded set of storage units includes on one or more of:
historical performance;
bandwidth; and
available storage.

15. The computing device of claim 10, wherein the processing module is further operable to store the at least one group of encoded data slices by:
   storing, via the interface, the at least one group of encoded data slices in one or more other memory devices of the plurality of memory devices of the storage unit.

16. The computing device of claim 10, wherein the processing module is further operable to store the at least one group of encoded data slices by:
   storing the at least one group of encoded data slices in another storage unit, wherein the set of storage units is expanded to include the other storage unit.

17. The computing device of claim 10, wherein the processing module is further operable to:
   determining whether the memory device still has the issue; and
   when the memory device no longer has the issue:
      send, via the interface, the at least one group of encoded data slices from the at least one other memory device to the memory device for storage therein.

18. The computing device of claim 17, wherein the processing module is further operable to:
   delete the at least one group of encoded data slices from the at least one other memory device.

* * * * *